US010731612B2

(12) United States Patent
Aponte Hernandez et al.

(10) Patent No.: US 10,731,612 B2
(45) Date of Patent: Aug. 4, 2020

(54) FUEL PUMP COVER

(71) Applicant: Nissan North America, Inc., Franklin, TN (US)

(72) Inventors: Maria Teresa Aponte Hernandez, Mexico City (MX); Takayuki Fuwa, Setagaya-Tokyo (JP)

(73) Assignee: Nissan North America, Inc., Franklin, TN (US)

( * ) Notice: Subject to any disclaimer, the term of this patent is extended or adjusted under 35 U.S.C. 154(b) by 129 days.

(21) Appl. No.: 15/884,038

(22) Filed: Jan. 30, 2018

(65) Prior Publication Data

US 2019/0234357 A1 Aug. 1, 2019

(51) Int. Cl.
*F02M 37/10* (2006.01)
*B60K 15/03* (2006.01)

(52) U.S. Cl.
CPC ........... *F02M 37/103* (2013.01); *B60K 15/03* (2013.01); *B60K 2015/03243* (2013.01); *B60K 2015/03453* (2013.01)

(58) Field of Classification Search
CPC .................... F02M 37/103; B60K 2015/03243
See application file for complete search history.

(56) References Cited

U.S. PATENT DOCUMENTS

| 4,651,701 | A | * | 3/1987 | Weaver | F02M 37/103 |
| | | | | | 123/497 |
| 5,611,373 | A | * | 3/1997 | Ashcraft | F16L 9/18 |
| | | | | | 138/113 |
| 6,367,650 | B1 | | 4/2002 | Kuehnemund et al. | |
| 6,546,955 | B1 | * | 4/2003 | Burke | F02M 25/089 |
| | | | | | 123/516 |
| 7,278,401 | B1 | * | 10/2007 | Cotton | F02M 37/0029 |
| | | | | | 123/457 |
| 7,642,459 | B2 | * | 1/2010 | Motoda | F02M 37/103 |
| | | | | | 174/17 VA |
| 8,826,941 | B2 | * | 9/2014 | Saito | F04B 27/1036 |
| | | | | | 138/89 |
| 2005/0194796 | A1 | * | 9/2005 | Powell | F02M 37/103 |
| | | | | | 292/256 |

* cited by examiner

*Primary Examiner* — Andrew T Kirsch
(74) *Attorney, Agent, or Firm* — Global IP Counselors, LLP

(57) ABSTRACT

A fuel pump cover includes a first cover member and a second cover member. The first cover member has an attachment flange configured to attach to a surface of a fuel tank, a cover part coupled to the attachment flange and configured to cover a first fuel pump outlet to a fuel pump, and an attachment feature. The second cover member is configured to be removably attached to the attachment feature, and configured to cover a second fuel pump outlet to the fuel pump.

13 Claims, 12 Drawing Sheets

FUEL PUMP COVER

BACKGROUND

Field of the Invention

The present invention generally relates to a fuel pump cover that protects portions of a fuel pump. More specifically, the present invention relates to a fuel pump cover that has two separable cover members to protect two separate inlets to the fuel pump.

Background Information

Vehicle fuel tanks typically include a fuel pump that is designed to fit within the fuel tank. The Fuel pump includes various attachment devices and elements that protrude from the top of the fuel tank. For example, the fuel outlets, vapor canister outlets and other elements can protrude from the top of the fuel tank. Some fuel tanks include a fuel pump protective cover to protect these elements. Conventional fuel pump protective covers generally are one piece.

SUMMARY

It has been discovered that single piece fuel pump protective covers can be difficult to attach and do not provide sufficient protection for many fuel pumps and the fuel pump elements. In view of the state of the known technology, one aspect of the present disclosure is to provide a fuel pump cover comprising a first cover member and a second cover member. The first cover member has an attachment flange configured to attach to a surface of a fuel tank, a cover part coupled to the attachment flange and configured to cover a first fuel pump outlet to a fuel pump, and an attachment feature. The second cover member is configured to be removably attached to the attachment feature, and configured to cover a second fuel pump outlet to the fuel pump.

In view of the state of the known technology, another aspect of the present disclosure is to provide a method installing a fuel pump cover. The method comprises attaching a first cover member having an attachment flange to a surface of a fuel tank such that a cover part coupled to the attachment flange covers an outlet to a fuel pump, attaching a first fuel hose to the first pump outlet, attaching a second fuel hose to an second pump outlet of the fuel pump, and attaching a second cover member to an attachment feature of the first cover member, the second cover member covering the second pump outlet.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
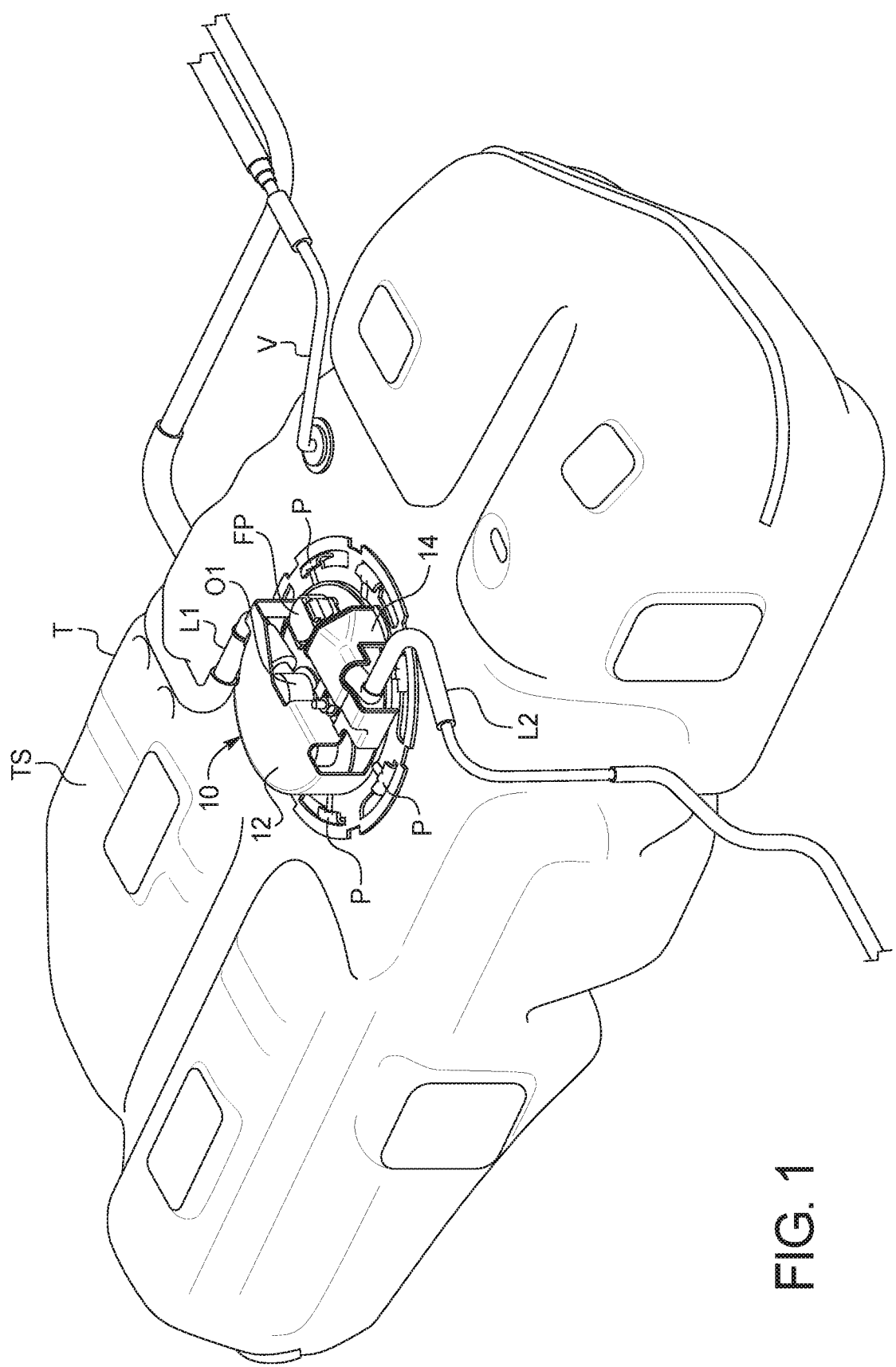
FIG. 1 is a top perspective view on a fuel pump cover according to the present invention attached to a fuel tank and covering a fuel pump.

Referring initially to FIG. 1, a protective fuel pump cover 10 is illustrated in accordance with a first embodiment. The fuel pump cover 10 is configured to detachably connect to a fuel tank T and protect elements of the fuel pump FP during unexpected vehicle contact situations or any other situation or occurrence in which the elements of the fuel pump FP could be comprised or damaged. The fuel pump cover 10 shown in FIG. 1 improves the protection of the fuel pump FP and facilitates the ease at which the fuel pump lines $L_1$ and $L_2$ can be attached and removed.

As can be understood, the fuel pump FP is designed to fit within the fuel tank T having a vent V and includes a first outlet $O_1$ and a second outlet $O_2$. The first outlet $O_1$ is connected to the first fuel pump outlet line $L_1$ or hose that is connected to the engine to supply the engine (not shown) with fuel. The second outlet $O_2$ connected to second outlet fuel pump outlet line $L_2$ or hose and is connected to a vapor canister (not shown). However, it is noted that the fuel pump cover 10 can protect any portion or elements od the fuel pump FP and is not necessarily limited to the outlets disclosed herein.

Figure 2:
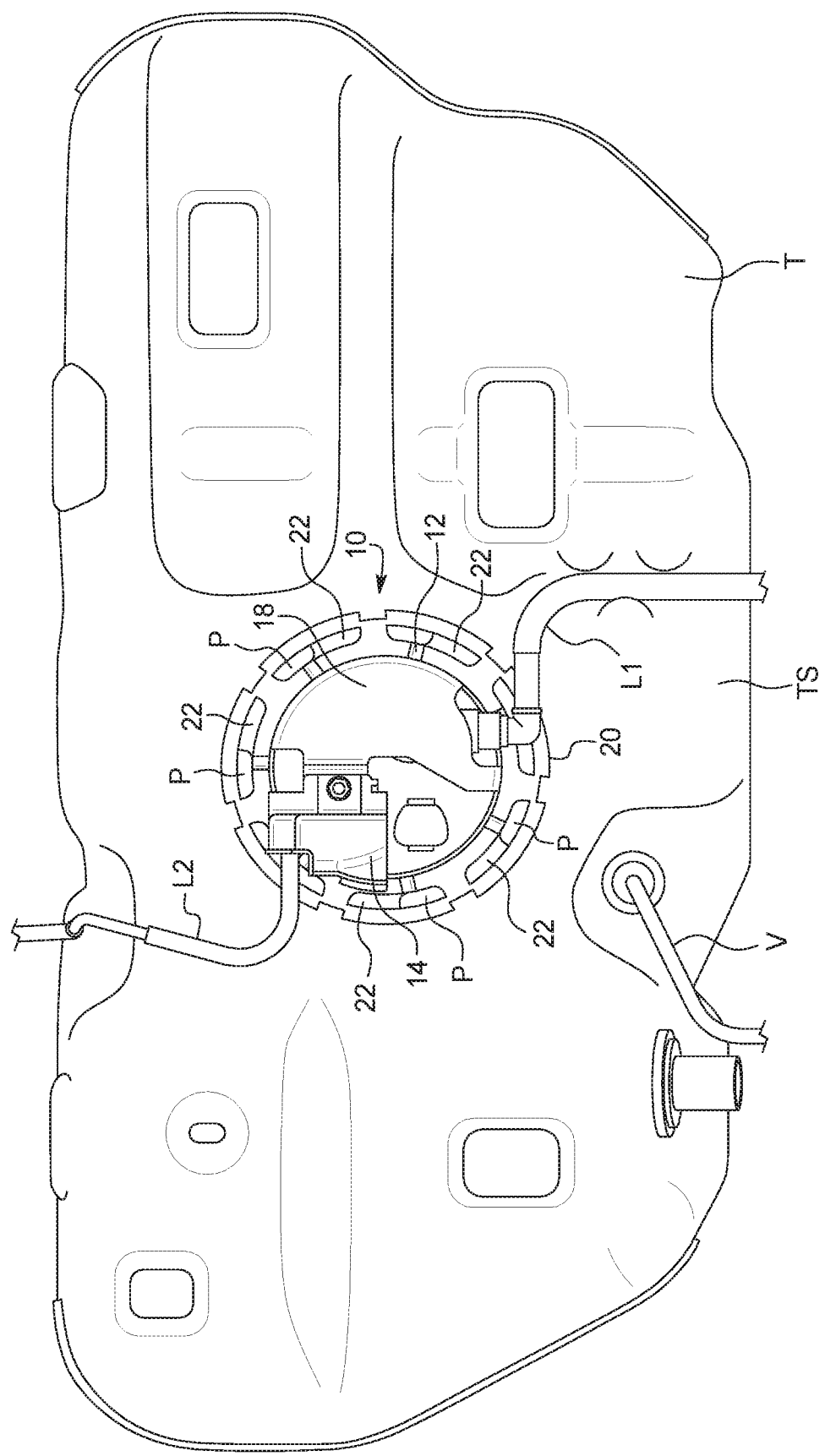
FIG. 2 is top plan view of the fuel pump cover of FIG. 1 to the fuel tank and covering a fuel pump.
Figure 3:
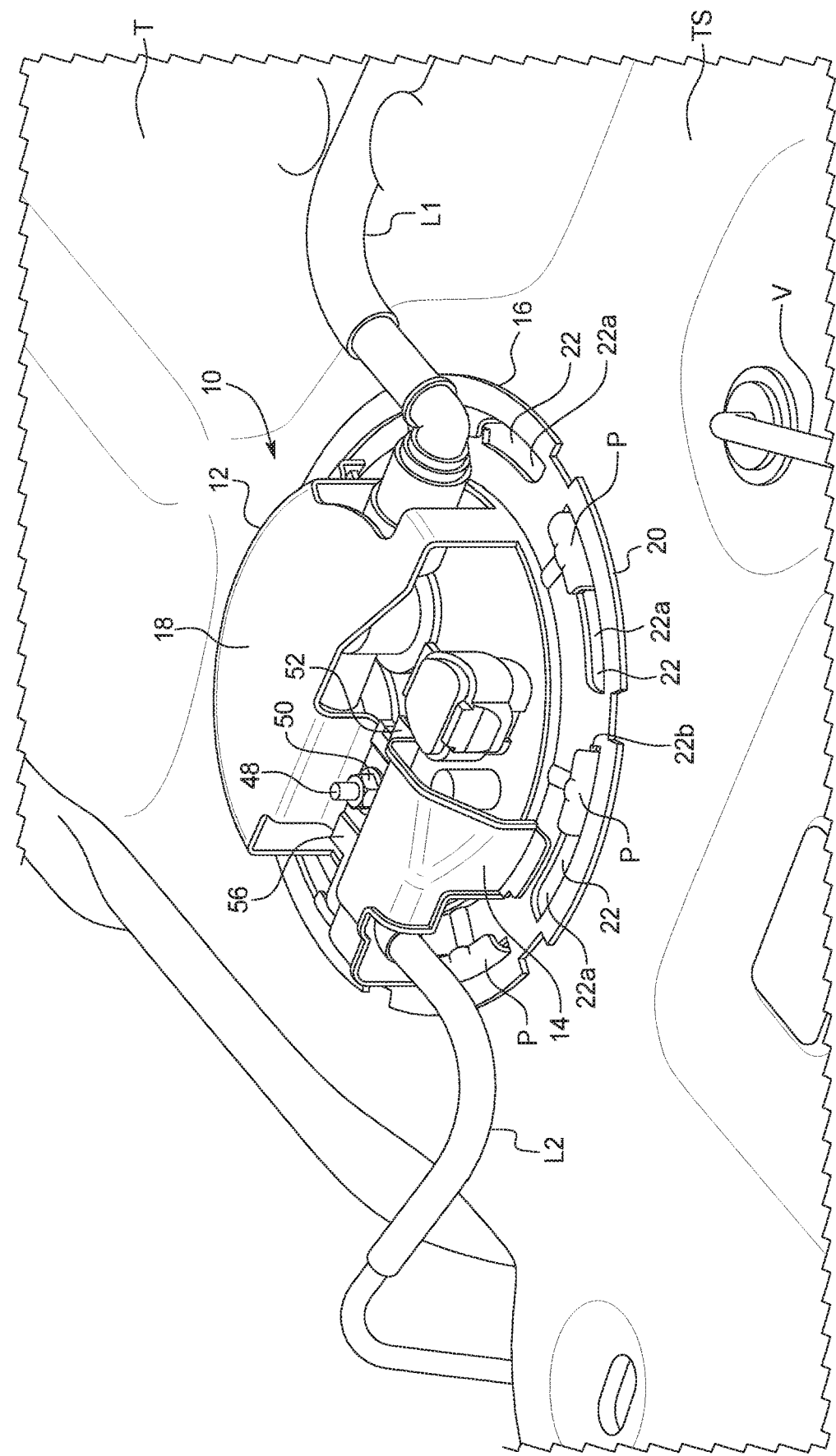
FIG. 3 is an enlarged top perspective view of the fuel pump cover of FIG. 1.

As shown in FIGS. 1-3, the fuel tank T can be any desired fuel tank, with the fuel pump P disposed in the top surface TS. The fuel tank T includes protrusions P molded into the top surface TS, which are configured to couple with the fuel pump cover 10. It is noted that while the fuel pump cover 10 can be attached to the protrusions P on the fuel tank T, the fuel pump cover 10 can be attached to the fuel tank T and/or fuel pump FP in any suitable or desired manner.

Figure 4:
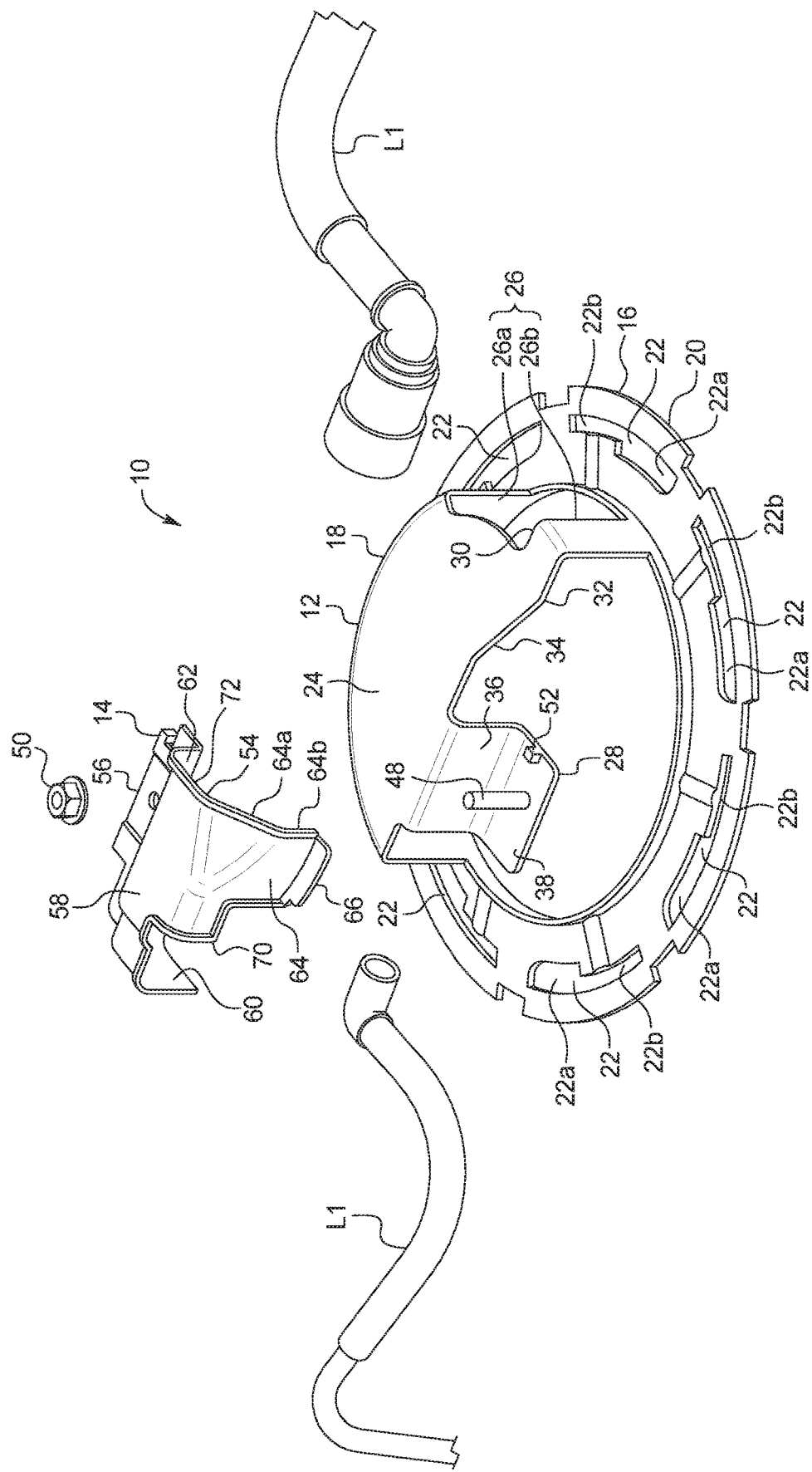
FIG. 4 is an exploded top perspective view of the fuel pump cover of FIG. 3.

As shown in FIG. 4, the fuel pump cover 10 includes a first cover member 12 and a second cover member 14. The first cover member 12 is configured to detachably attach to the fuel tank T, as described herein, and protect the first outlet $O_1$ connected to the first outlet line $L_1$. The second cover member 14 is configured to detachably attach to the first cover member 12 and protect the second outlet $O_{12}$ connected to the second outlet line $L_2$.

Figure 5:
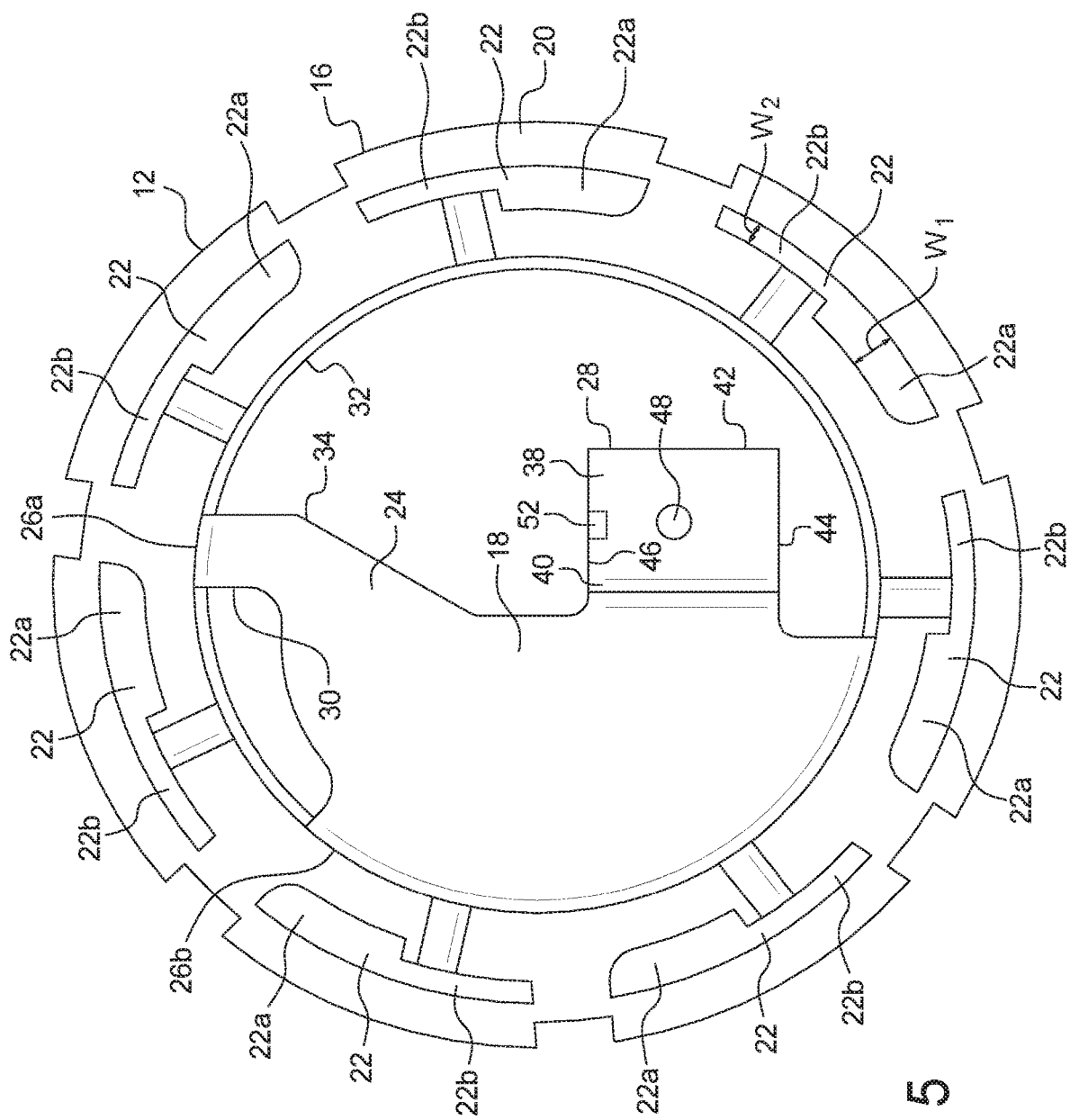
FIG. 5 is top view of the first cover member.
Figure 6:
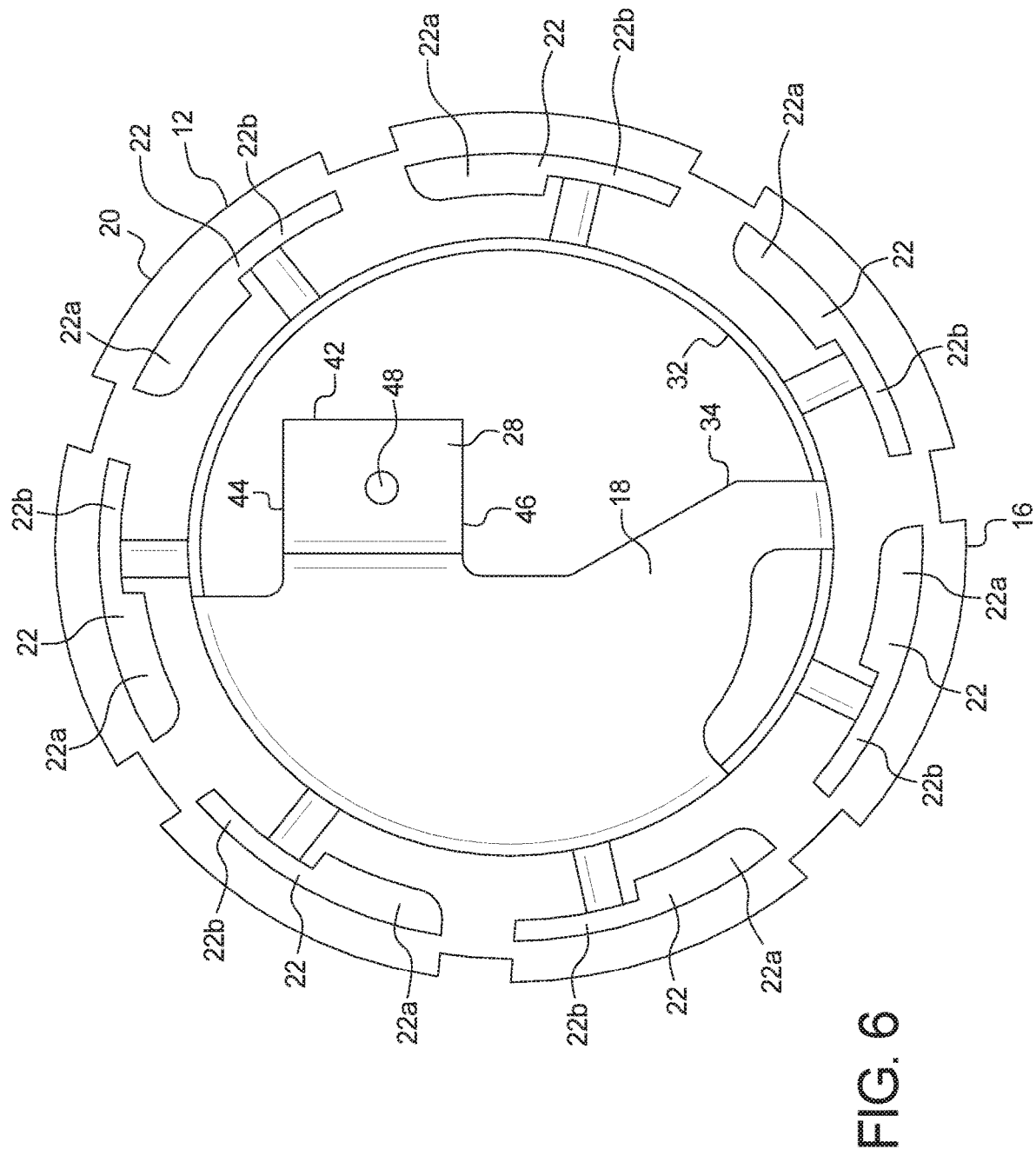
FIG. 6 is a bottom view of the first cover member.
Figure 7:
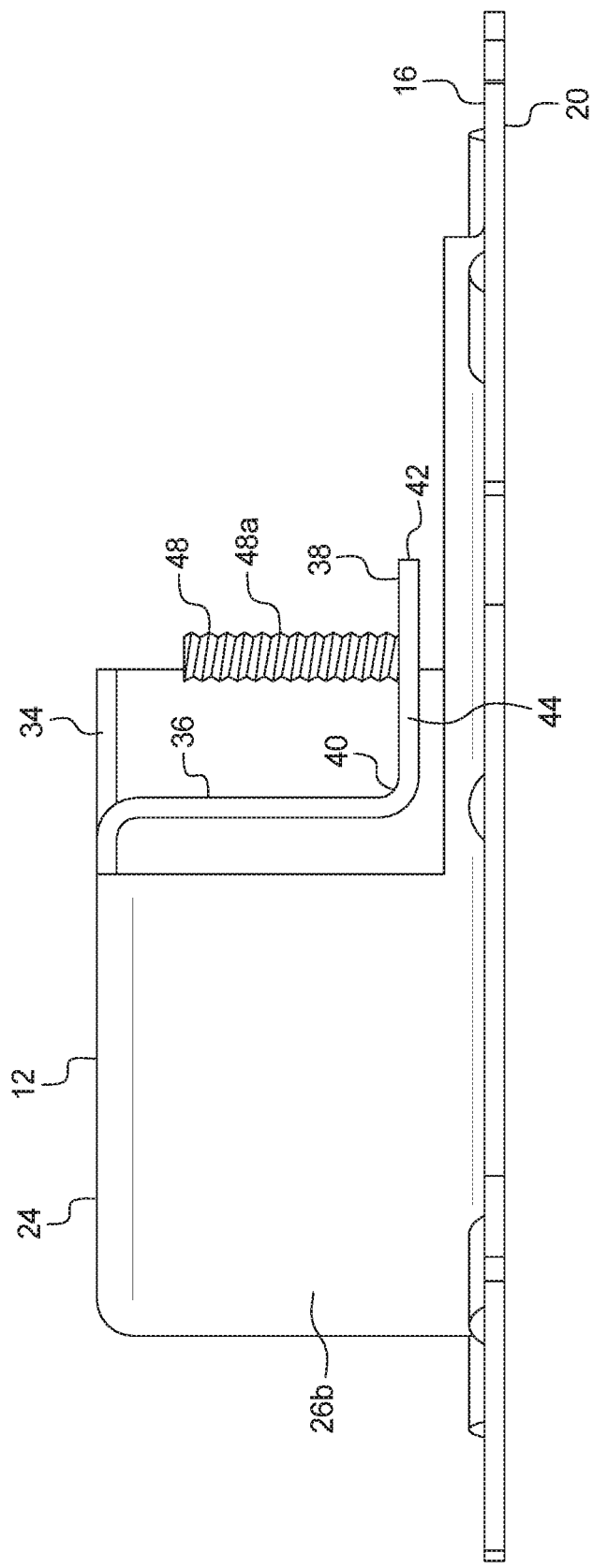
FIG. 7 is side view of the first cover member.

As shown in FIGS. 5-7, the first cover member 12 includes a substantially circular base portion 16 and a cover portion 18. The first cover member 12 is preferably formed from plastic or thermoplastic. The base portion 16 includes a flange 20 that radially extends outwardly from the cover portion 18. The base portion 16 is configured to be disposed adjacent the top surface TS of the fuel tank T when in an installed position and includes a plurality of openings therein 22. As in FIGS. 5 and 6, each of the openings has a first portion 22a and a second portion 22b. The first portion 22a has a width W₁ that is greater than the width W2 of the second portion 22b. Thus, the protrusions P on the top surface TS of the fuel tank T can be inserted into the first portion 22a and when rotated towards the second portion 22b an interference or snap fit will hold the first cover member 12 in place on the top surface TS of the fuel tank T. In other words, the wider first portion 22a enables easy positioning of the protrusions P of the fuel tank T in the openings 22. The first cover member 12 is rotated clockwise, such that protrusions P are locked into place within the second portions 22b of the openings 22. It is noted that the first cover member 12 does not necessarily need to be attached to the fuel tank T in this manner, and can be attached in any desired or suitable manner.

The cover portion 18 of the first cover member 12 includes a top surface 24, side walls 26 and a flange portion 28. The top surface 24 is generally parallel to the flange 28 of the base portion 16 and has a generally semi-circular shape. The side walls 26 include a first arcuate side wall 26a and a second side wall 26b that define an opening 30 or space therebetween. The side walls 26 generally extend perpendicularly or transverse to the top surface 24. The opening 30 enables access to the first outlet $O_1$ when the first cover member 12 is in an installed position. The cover portion 18 has a large opening 32 along an edge 34 thereof that generally runs through the diameter of the base portion 16. The flange portion 20 extends from the edge 34. The flange portion includes a first flange part 36 and a second flange part 38. The first flange part 36 is generally rectangular and extends generally downwardly from the edge 34. In one embodiment, the flange portion 28 can be offset from the center of the first cover member; however, the flange portion 28 can be disposed in any suitable position. The second flange part 38 is generally rectangular and extends substantially perpendicularly or transverse from the first flange 36 part and in a direction away from the first flange part 36 and thus the edge 34. Accordingly, as can be understood, the second flange part 38 extends such that it is substantially parallel with the top surface 24 of the first cover member 12. The second flange part 38 includes a proximal end 40 adjacent the first flange part 36 and s distal or free end 42 opposite the proximal end 40. The second flange part has a first side edge 44 and a second side edge 46 that extend between the proximal end 40 end the distal end 42.

The second flange part 38 includes an attachment feature or protrusion 48 extending therefrom. In one embodiment, the attachment feature 48 is a cylindrical threaded post that extends substantially perpendicularly or transverse from the second flange part 38. That is, the attachment feature 48 includes threads 48a capable of receiving a nut 50. The attachment feature 48 can be disposed generally in the center of the second flange part 38; however, it is noted that the attachment feature can be disposed in any position and in any manner desired. The second flange part 38 also includes a stop mechanism or protrusion 52. The stop mechanism 52 is generally rectangular and extends upwardly from the second side edge 46 of the second flange part 38. In one embodiment, the stop mechanism 52 is disposed along the second side edge 46 between the distal and proximal ends 40 and 42. However, the stop mechanism 52 can be disposed in any suitable position.

Figure 9:
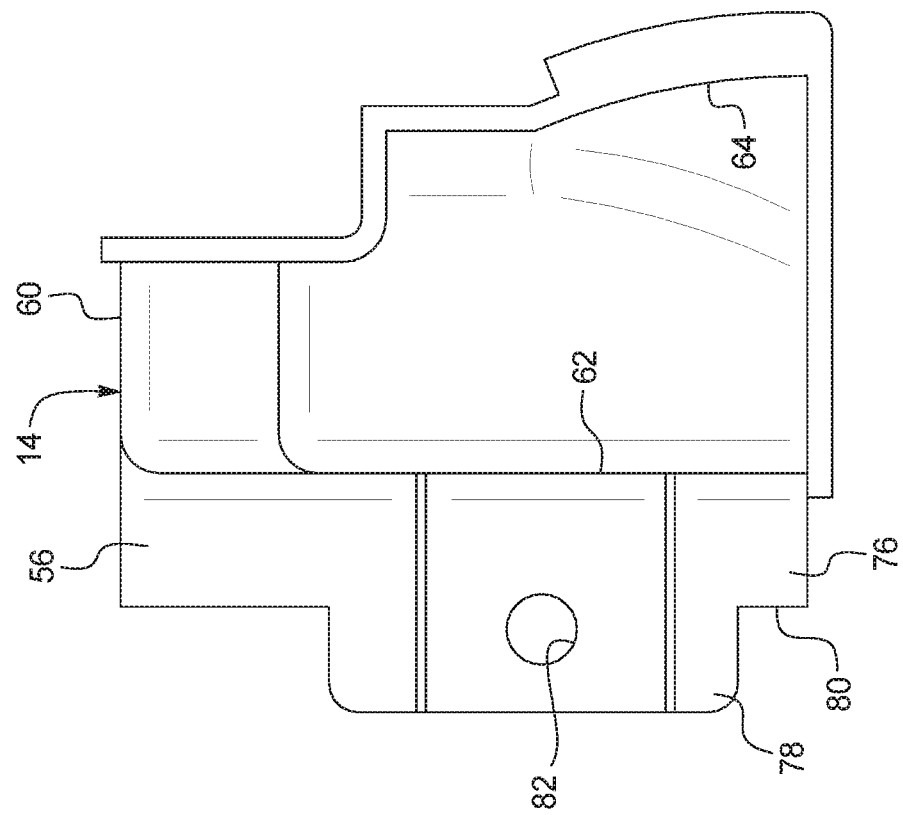
FIG. 9 is a bottom view of the second cover member.
Figure 8:
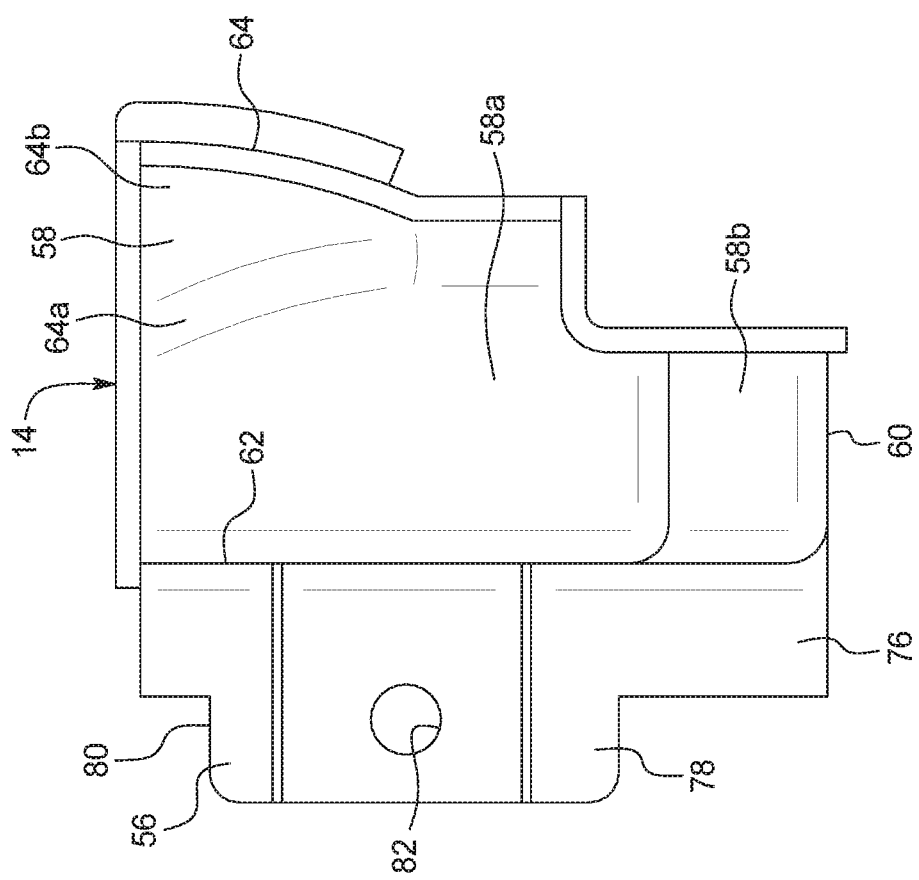
FIG. 8 is top view of the second cover member.
Figure 10:
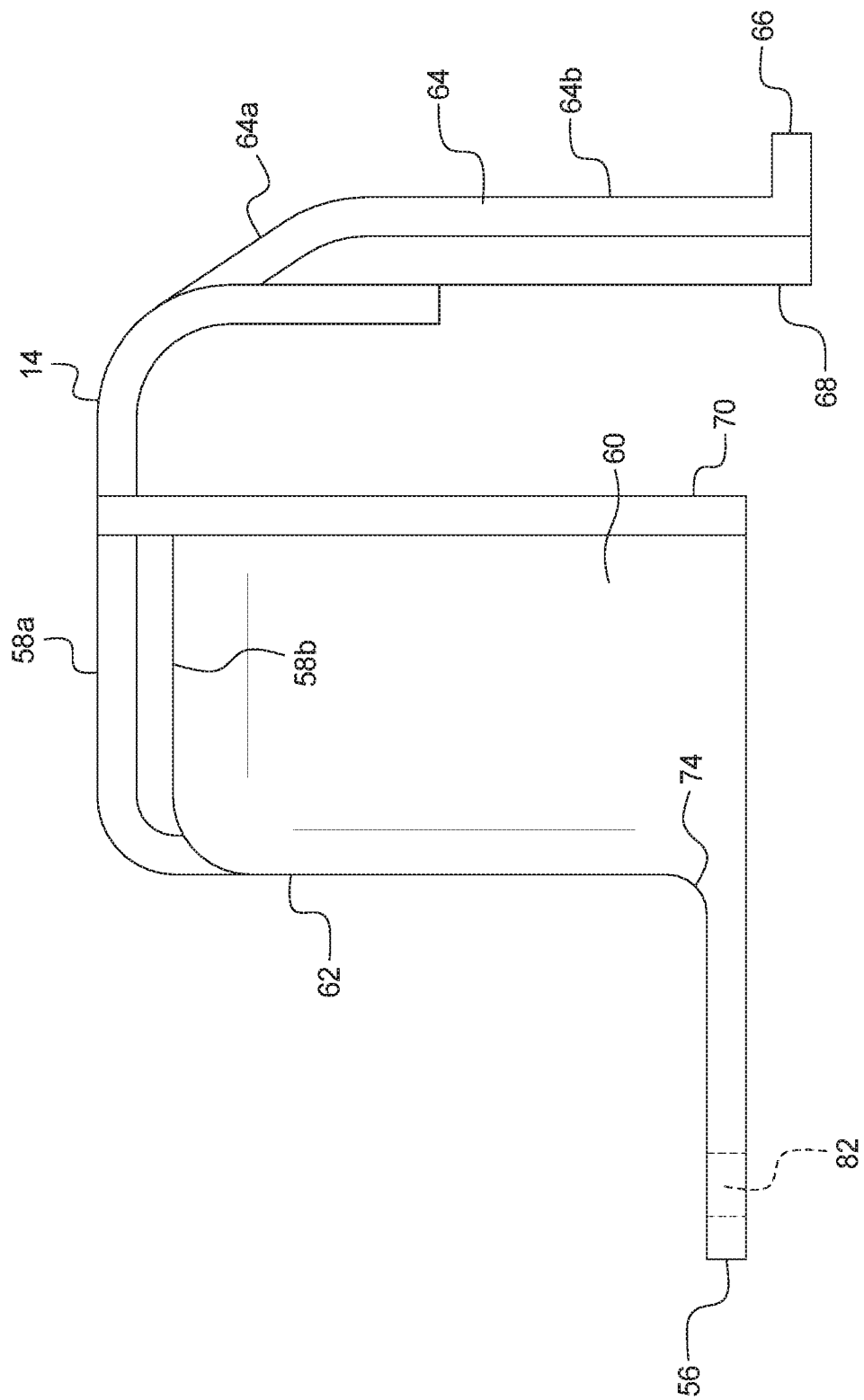
FIG. 10 is side view of the second cover member.

As shown in FIGS. 8-10, the second cover member 14 includes a cover portion 54 and an attachment portion 56. The second cover member 14 is preferably formed from plastic or thermoplastic. The cover portion 54 of the second cover member 14 includes a top surface 58, an end wall 60 and first and second side walls 62 and 64. The top surface 58 includes two levels, each of which is generally parallel to the flange 20 of the base portion 16. That is, the top surface 58 includes a first top surface portion 58a and a second top surface portion 58b. The second top surface portion 58b is lower than the first top surface portion 58a. Each of the first and second top surface portions 58a and 58b have a generally rectangular configuration. The end wall 60 extends downwardly from the second top surface portion 58b and is attached the first side wall 62. The first side wall 62 extends downwardly from both of the first and second top surface portions 58a and 58b and generally along the entire length of the second cover member 14. The second side wall 64 is opposite the first side wall 62 and preferably only extends from the first top surface portion 58b. The second side wall 64 has an angularly extending portion 64a and a vertical extending portion 64b. The angularly extending portion 64a extends directly from the first top surface portion 58a and forms an angle of about 60 degrees with the first top surface portion 58a. The vertical extending portion 64b extends vertically from the angularly extending portion 64a such that the vertically extending portion 64b is generally perpendicular or transverse to the top surface 58 of the second cover member 14. A lip or protrusion 66 extends from a distal end 68 of the vertical extending portion 64b. The lip 66 extends generally parallel to the flange 20 on the base portion 16 and the vertically extending portion 64b is generally sized and configured such that the lip 66 is disposed to rest on or contact the base portion 16.

The end wall 60 and the second side wall 64 form an opening or gap 70 in the second cover member 14 that enables access to the second outlet $O_2$, such that the second outlet line $L_2$ can be detachably connected to the second outlet $O_2$. The first top surface portion 58a, the first side wall 62 and the second side wall 64 form an opening 72 at an end opposite the end wall 60 in the second cover member 14.

The attachment portion 56 of the second cover member 14 extends outwardly from the end of a distal end 74 of the first side wall 62. The attachment portion 56 can be generally the same length as the first side wall 62. The attachment portion includes a base part 76 and a protruding part 78. The protruding part 78 extends in such a manner that a notch 80 is formed in a side thereof. A generally circular opening 82 is formed generally in the protruding part 78, but can be formed in any part or in any combination of parts of the second cover member 14. The opening 82 in the second cover member 14 has a diameter that is substantially the same size as the attachment feature 48 of the first cover member 12, such that the attachment feature 48 can extend through the opening 82.

Each of the first and second cover members 12 and 14 can be formed from a mold such that each member is of unitary construction. The attachment feature 48 can be attached to the first cover member 12 in any manner desired.

Figure 11:
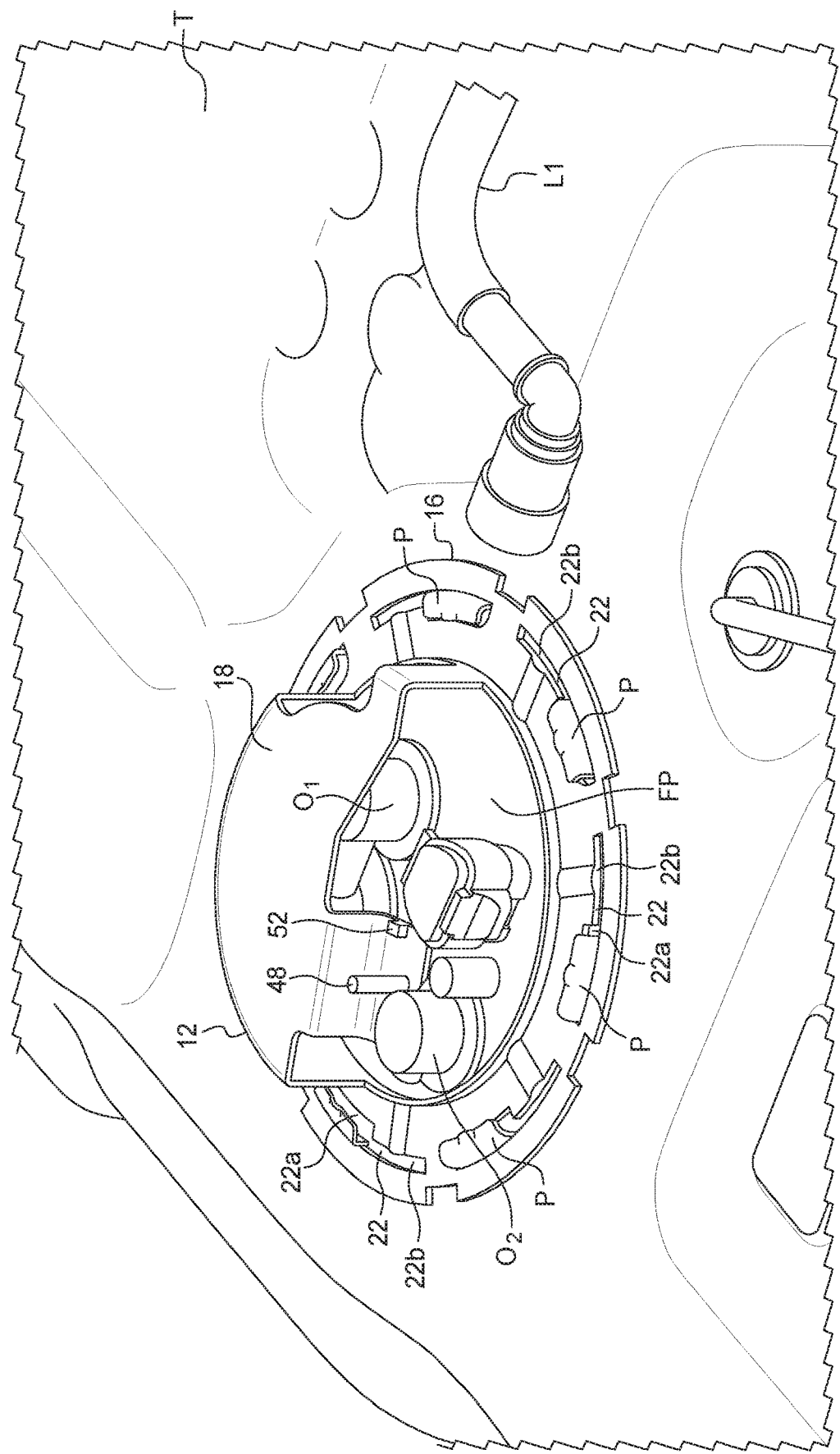
FIG. 11 is a top perspective view of the fuel pump cover of FIG. 3 with the protrusions from the fuel tank disposed in the openings of the first cover member.
Figure 12:
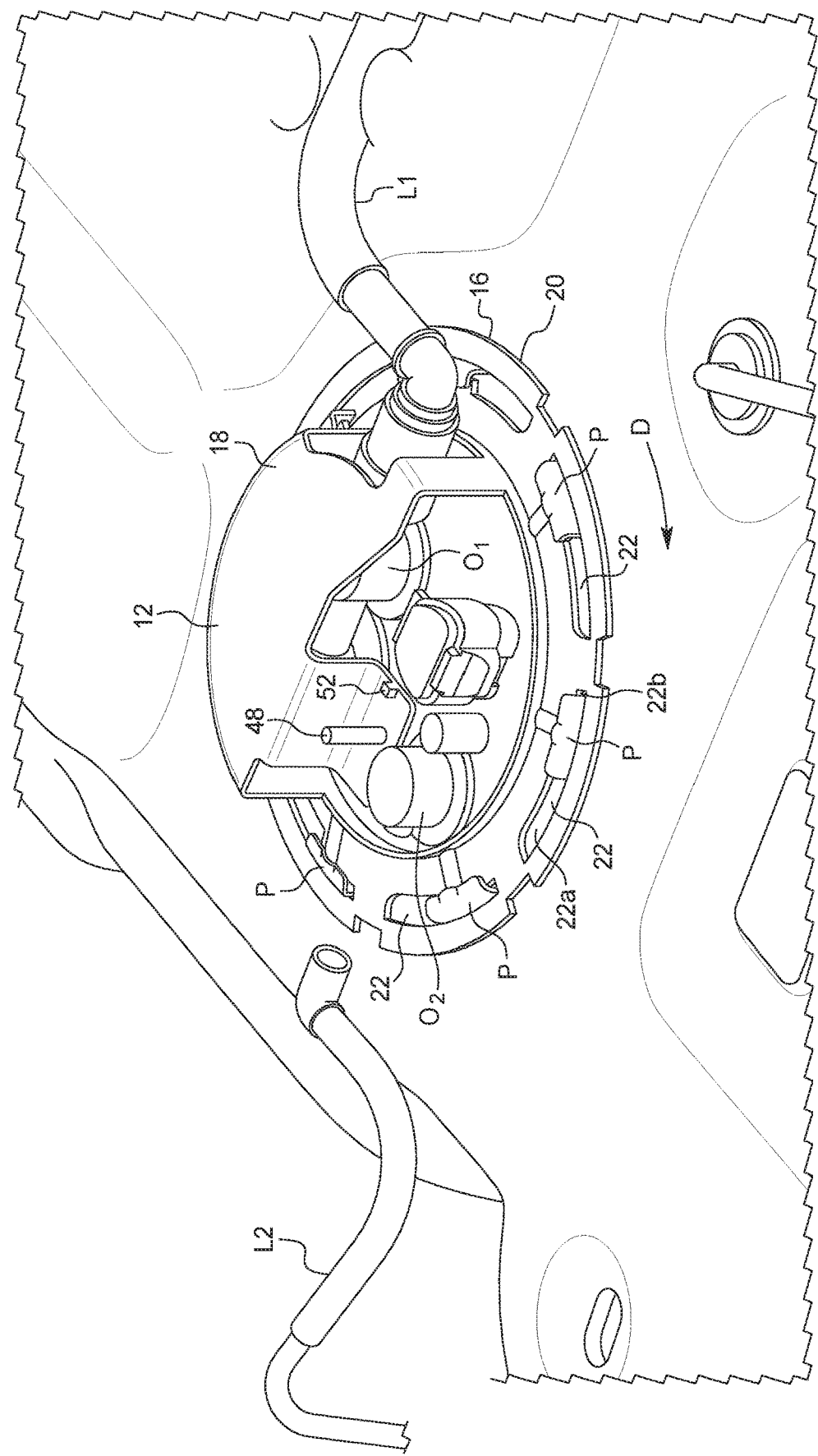
FIG. 12 is a top perspective view of the fuel pump cover of FIG. 11 with the first cover member rotated in a locked position and the first outlet line of the first outlet attached.
Figure 13:
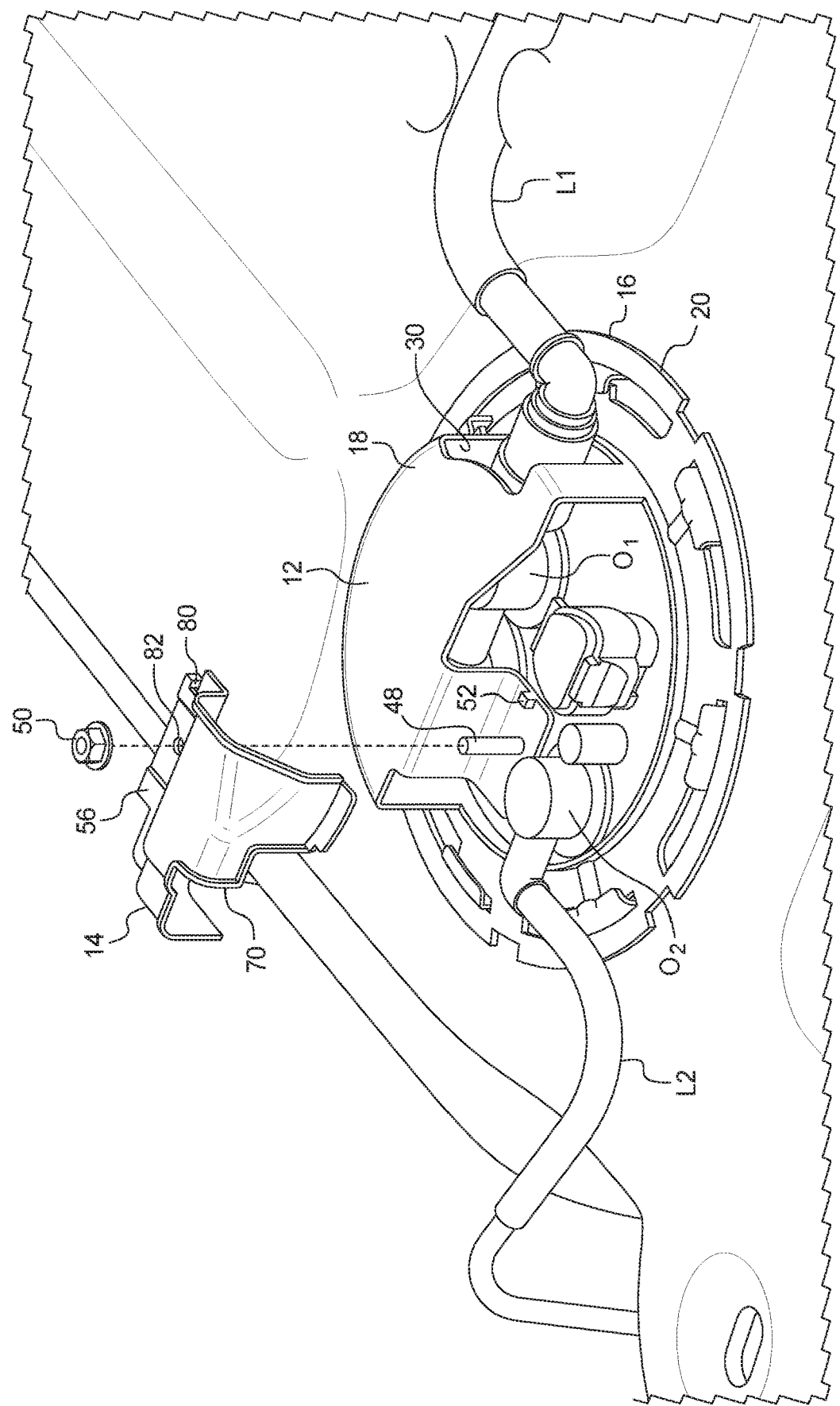
FIG. 13 is a top perspective view of the fuel pump cover of FIG. 12 with the second outlet line attached and the second cover member being installed.

Turning to FIGS. 11-13, the installation of the fuel pump cover 10 will be discussed. As shown in FIG. 11, the first cover member 12 is attached to the fuel tank T to cover the fuel pump FP. In this embodiment, the protrusions P on the fuel tank T are inserted into the first portion 22a of the openings 22 in the base portion 16. As shown in FIG. 12, The first cover member 12 is then rotated in a clockwise direction D such that the protrusions P on the fuel tank T are slid into the second portion 22b of the openings 22. This rotation locks the first cover member 12 in place on the fuel tank T to cover a portion of the fuel pump FP. The first outlet line $L_1$ is then attached to the first outlet $O_1$ by inserting the first outlet line $L_1$ through the opening 30 in the first cover member 12. The first cover member 12 in this position will cover the first outlet $O_1$ and protect the first outlet $O_1$ from damage or breaking in adverse conditions.

As shown in FIG. 13, the second outlet line is then attached to the second outlet. The second cover member 14 is then attached to the first cover member 12. Specifically, the second cover member 14 is attached by inserting the attachment feature 48 of the first cover member 12 through the opening 82 in the attachment portion 56 of the second cover member 14. The second cover member 14 is positioned such that the stop mechanism 52 on the first cover member 12 is disposed in the notch 80 on the second cover member 14. The nut 50 is then screwed onto the threads 48a of the attachment feature 48. As the nut 50 is threaded and engages the attachment portion 56 on the second cover member 14, the friction between the two may cause the second cover member 14 to rotate. This rotation is stop by the stopping mechanism 52, since the stopping mechanism 52 on the first cover member 12 will abut against the notch 80 of the attachment portion 56. Thus, the nut 50 can be securely threaded onto the attachment feature 48 and securely attach the second cover member 14 to the first cover member 12.

Once the second cover member 14 is secured in the first cover member, the lip 66 contacts the base portion 16 and the end wall is disposed above the base portion 16 so as to form a gap therebetween. This configuration enables the second cover member 14 to absorb energy in an inadvertent vehicle contact situations. Moreover, the second cover member 14 in this position will cover the second outlet $O_2$ and protect the second outlet $O_2$ from damage or breaking in adverse conditions. The second outlet line $L_2$ thus extends through the opening 70 in the second cover member 14.

Such a configuration will enable the first and second outlets $O_1$ and $O_2$, along with additional elements of the fuel pump FP to be protected during inadvertent vehicle contact or any other adverse conditions. Moreover, the fuel pump cover 10 described herein enables access to the first and second outlet lines $L_1$ and $L_2$ such that each line can be removed individually without removing the fuel pump cover.

The fuel tank and fuel pump are conventional components that are well known in the art. Since fuel tank and fuel pump are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "above", "downward", "vertical", and "transverse" as well as any other similar directional terms refer to those directions of a Fuel Pump Cover. Accordingly, these terms, as utilized to describe the present invention should be interpreted relative to a Fuel Pump Cover.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel pump cover comprising:
    a first cover member having an attachment flange configured to attach to a surface of a fuel tank, a cover part coupled to the attachment flange and configured to cover a first fuel pump outlet to a fuel pump, and an attachment feature, the cover part including a top surface covering the first fuel pump outlet to protect the first fuel pump outlet from damage and at least partially forming an opening that enables access to the first fuel pump outlet; and
    a second cover member configured to be removably attached to the attachment feature, and being configured to cover a second fuel pump outlet to the fuel pump and including an opening configured to enable access to the second fuel pump outlet.

2. The fuel pump cover according to claim 1, wherein the first cover member is substantially circular and is configured to rotatably attach to the surface of the fuel tank.

3. The fuel pump cover according to claim 1, wherein the second cover member includes an opening configured to receive the attachment feature.

4. The fuel pump cover according to claim 1, wherein the attachment feature includes threads configured to receive a nut to secure the second cover member to the first cover member.

5. The fuel pump cover according to claim 1, wherein the first cover member includes a stop mechanism to prevent rotation of the second cover member.

6. The fuel pump cover according to claim 1, wherein
the cover part includes a first side wall and a second side wall, the first and second side walls and the top surface forming the opening that enables access to the first fuel pump outlet.

7. A method installing a fuel pump cover, the method comprising:
attaching a first cover member having an attachment flange to a surface of a fuel tank such that a cover part coupled to the attachment flange covers an outlet to a first fuel pump outlet, the cover part including a top surface covering the first fuel pump outlet to protect the first fuel pump outlet from damage and at least partially forming an opening that enables access to the first fuel pump outlet;
attaching a first fuel hose to the first pump outlet;
attaching a second fuel hose to the second pump outlet of the fuel pump; and
attaching a second cover member to an attachment feature of the first cover member, the second cover member covering the second pump outlet and including an opening that enables the second fuel hose access to the second pump outlet.

8. The method according to claim 7, wherein
the attaching the first cover member includes rotating the first cover member such that a flange attaches to a surface of the fuel tank.

9. The method according to claim 7, wherein
the attaching the first fuel hose to the first pump outlet includes passing the first fuel hose through an opening in the first cover member.

10. The method according to claim 7, wherein
the attaching the second cover member to the attachment feature of the first cover member includes passing the attachment feature through an opening in the second cover member.

11. The method according to claim 7, wherein
the attaching the second cover member to the attachment feature of the first cover member includes threading a nut onto threads on the attachment feature to secure the second cover member to the first cover member.

12. The method according to claim 11, wherein
threading the nut onto threads on the attachment feature includes preventing rotation of the second cover member with a stop mechanism.

13. The fuel pump cover according to claim 7, wherein
the cover part includes a first side wall and a second side wall, the first and second side walls and the top surface forming the opening that enables access to the first fuel pump outlet.

* * * * *